J. A. G. HARRISSON.
CONSTANT DISCHARGE GAGE.
APPLICATION FILED NOV. 26, 1913.
1,107,065.
Patented Aug. 11, 1914.
2 SHEETS—SHEET 1.
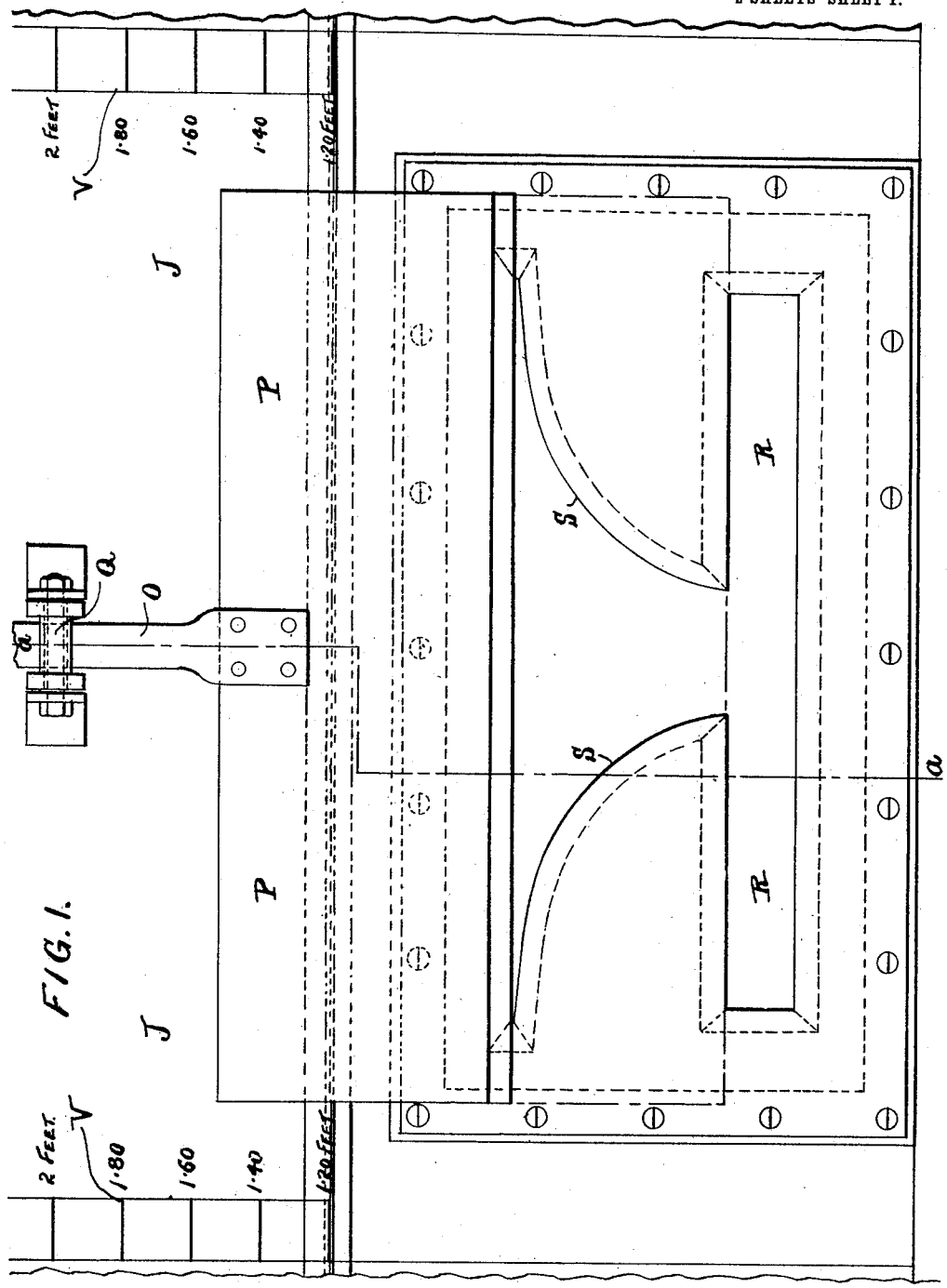
INVENTOR
JAMES ALBERT GRAYSON HARRISSON

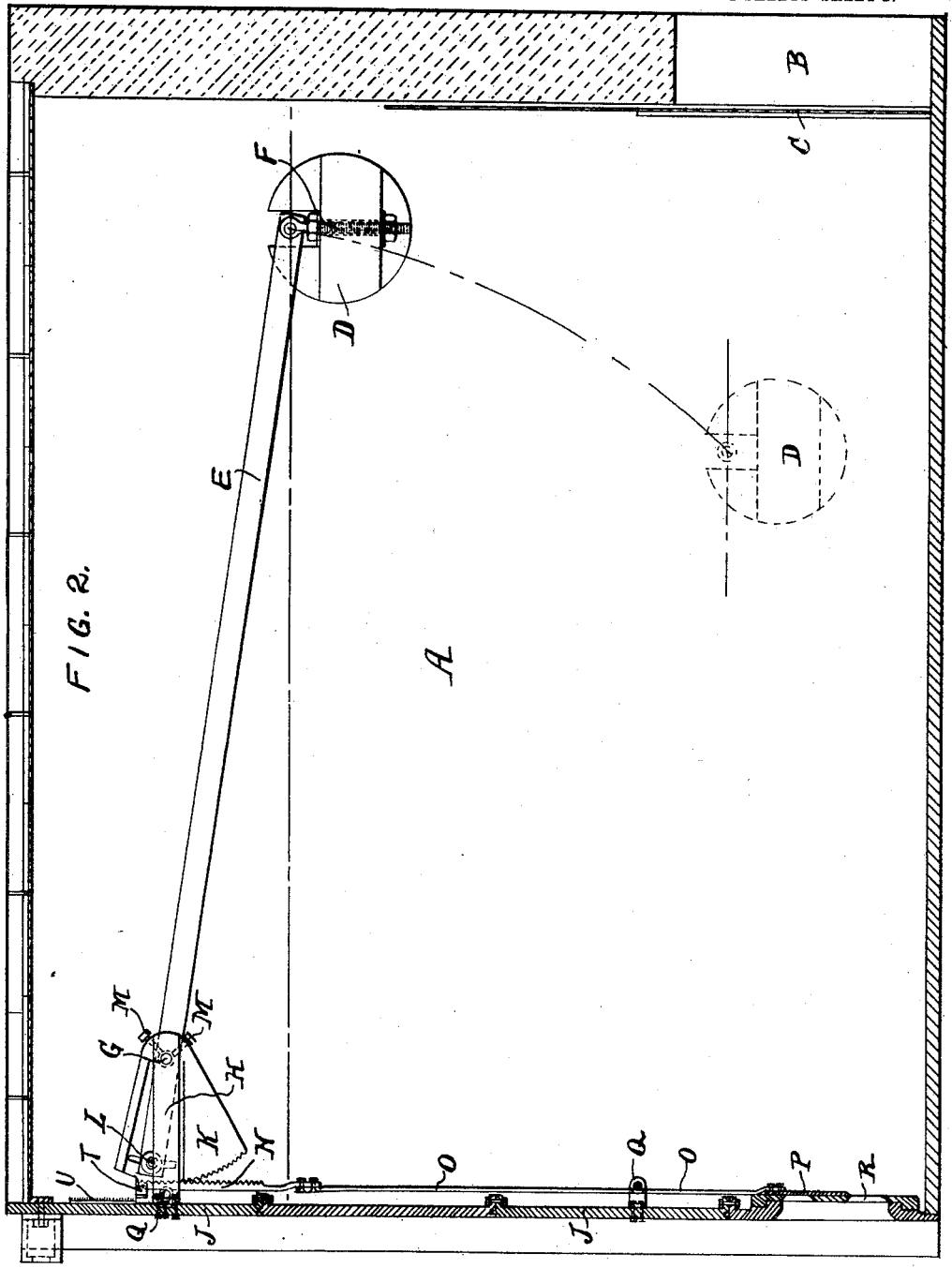

UNITED STATES PATENT OFFICE.

JAMES ALBERT GRAYSON HARRISSON, OF CANTERBURY, ENGLAND.

CONSTANT-DISCHARGE GAGE.

1,107,065.           Specification of Letters Patent.      Patented Aug. 11, 1914.

Application filed November 26, 1913. Serial No. 803,248.

*To all whom it may concern:*

Be it known that I, JAMES ALBERT GRAYSON HARRISSON, a subject of the King of Great Britain and Ireland, and a resident of Canterbury, in the county of Kent, England, have invented a certain new and useful Constant-Discharge Gage, of which the following is the specification.

The invention has for its object to provide an apparatus to regulate and discharge with the greatest accuracy a known and constant quantity of water from a parent canal into a branch stream or canal, irrespective of any variation of head that would be likely to come within the range of irrigation works.

An apparatus made according to the invention comprises essentially a notch orifice or sill, a shutter movable over the orifice, and a float operatively connected to the shutter in suchwise that it moves the shutter to constrict the orifice as it, the float rises, and vice versa. The float operates in the stream having access to a chamber and thence to the notch orifice or sill, and the side walls of the notch are so contoured that the shutter-controlled orifice is always of an area giving a constant discharge notwithstanding the variation in the head—that is to say, as the float rises it operates through the shutter to constrict the orifice in the ratio of the increased discharge which would take place owing to the increased head (as indicated by the rise of the float) were the orifice area constant. Alternatively to contouring the side walls of the orifice, it is evident that other equivalent means may be used to the same end. Means are preferably provided for giving any desired constant volume of discharge, either by variation in the position of the parts of the notch, or shutter, or by the substitution of parts differently contoured.

In order that the invention and the manner of performing the same may be properly understood, there are hereunto appended two sheets of explanatory drawings in which is shown in—

Figure 1 Sheet 1 in elevation, and in Fig. 2 Sheet 2 in side elevation to a reduced scale and on the line $a$—$a$ of Fig. 1, an illustrative example of the carrying out of the invention.

In this example, the water, the discharge of which is to be regulated, enters a chamber A by way of a usual sluice gate C, the opening B being guarded by a gauze screen (not shown). The level of water in this chamber is to be considered as varying between the points indicated by chain lines. In the chamber is a float D of wood or other convenient material. This float is adjustably connected to a lever E by shackle bolts F. The lever is pivoted on a short shaft G supported in brackets H from the fore-wall J of the chamber. On the shaft G is fixed a toothed quadrant K. The lever E is adjustable relatively to the quadrant, is secured to the quadrant by a bolt L passing through a curved slot therein, and is finally locked by two set screws M passing through a boss on it and engaging the shaft G. The quadrant gears with a rack N fixed to a draw-bar O fixed in turn to a shutter P, the parts being guided by rollers Q in brackets on the wall J.

The apparatus is in perfect adjustment when the point of pivoting of the float to the lever E is at exactly the same level as the water in the tank, and when an indicator T attached to the rack N points also on a graduated scale U on the wall J to exactly the same reading as the level of the water in the tank as indicated on the scale V shown partly in Fig. 1. The first adjustment is to set the point of pivoting of the float to the lever to exactly the same level as the water level by adjusting the nuts on the shackle bolts F. When this adjustment has been made it may be found that the indicator T is not pointing to exactly the same reading on the graduated scale U as the level of the water. To correct this, all that is necessary is to release the bolt L which fastens the quadrant K to the lever E and the set screws M holding the quadrant to the shaft G. The rack N is then raised or lowered so that the indicator T is set to its true position on the graduated scale U.

The lower edge of the shutter P is horizontal, and, as more clearly seen in Fig. 1—which is a view looking toward the forewall J from the interior of the chamber A—it coacts with the notch orifice or sill, it being retained thereagainst by the pressure within the chamber. This notch orifice or sill comprises a lower and constant area part R of rectangular form and an upper part the sides S of which are curved in suchwise that when the shutter P rises and falls, due to its operative connection with the float and so due to the increase and decrease in head in the chamber A, it maintains such an area relative to that increase and decrease of head that a uniform discharge ensues. In the particular form shown, allowance is of course made for that slight irregularity in angular movement of the float and its lever due to the varying angle at which the buoyancy moment of the float is applied to the lever during its rise and fall. In conformity with usual practice, the notch apertures and the acting edge of the shutter are beveled as indicated from the discharge side inward to sharp edges.

What I claim is:—

1. In apparatus of the character described, a float chamber, a discharge orifice below the water level in said chamber, said orifice comprising a lower and constant area part and an upper part of upwardly increasing width, a shutter controlling the area of said orifice and a float controlling the position of said shutter, the parts being proportioned and combined to insure a constant discharge from the orifice irrespective of the head of water in the float chamber.

2. In apparatus of the character described, a float chamber, a discharge orifice constantly below the water level in said chamber, said orifice comprising a lower portion and an upper portion communicating therewith, the capacity of both portions combined under the head of the water at its lowest level in said chamber being substantially equal to the capacity of the lower portion alone under the head of the water at its highest level in said chamber, for the purpose described.

3. In apparatus of the character described, a float chamber, a discharge orifice constantly below the water level in said chamber, said orifice comprising a lower portion and an upper portion communicating therewith, the capacity of both portions combined under the head of the water at its lowest level in said chamber being substantially equal to the capacity of the lower portion alone under the head of the water at its highest level in said chamber, in combination with a shutter controlling the exposed area of said orifice and a float automatically controlling the position of said shutter, for the purpose described.

In testimony whereof I have signed my name to this specification, in the presence of two subscribing witnesses.

JAMES ALBERT GRAYSON HARRISSON.

Witnesses:
GUSTAVE CORBES,
PHILIP DAWSON.

---

Copies of this patent may be obtained for five cents each, by addressing the "Commissioner of Patents, Washington, D. C."